(12) United States Patent
Noubarian

(10) Patent No.: US 8,898,917 B1
(45) Date of Patent: Dec. 2, 2014

(54) COMBINATION LEVEL AND PROTRACTOR

(76) Inventor: Ohannes Noubarian, East York (CA)

( * ) Notice: Subject to any disclaimer, the term of this patent is extended or adjusted under 35 U.S.C. 154(b) by 333 days.

(21) Appl. No.: 13/403,101

(22) Filed: Feb. 23, 2012

(51) Int. Cl.
*G01C 9/12* (2006.01)
*G01C 9/18* (2006.01)

(52) U.S. Cl.
USPC .............................................. 33/451; 33/391

(58) Field of Classification Search
CPC ................................... G01C 9/12; G01C 9/18
USPC .................... 33/391, 396, 398, 451
See application file for complete search history.

(56) References Cited

U.S. PATENT DOCUMENTS

| | | | | |
|---|---|---|---|---|
| 597,886 | A * | 1/1898 | Minot | 33/368 |
| 598,101 | A * | 2/1898 | Kane | 33/451 |
| 762,780 | A * | 6/1904 | Waggoner | 33/338 |
| 842,874 | A * | 2/1907 | Downs | 33/391 |
| 1,122,349 | A * | 12/1914 | Wyatt et al. | 33/391 |
| 1,435,365 | A | 11/1922 | Zieman | |
| 1,449,669 | A * | 3/1923 | Grossman | 33/368 |
| 1,597,960 | A * | 8/1926 | Eltag | 33/368 |
| 1,700,278 | A * | 1/1929 | Barnett | 33/391 |
| 1,732,335 | A * | 10/1929 | Iverson | 33/391 |
| 2,694,866 | A * | 11/1954 | Hanauer | 33/391 |
| 2,859,533 | A * | 11/1958 | Prades | 33/396 |
| 2,956,346 | A * | 10/1960 | White et al. | 33/391 |
| 2,993,281 | A | 7/1961 | Dock | |
| 3,533,167 | A * | 10/1970 | Thompson et al. | 33/351 |
| 4,590,682 | A | 5/1986 | Koch | |
| 4,843,725 | A | 7/1989 | Harris | |
| 5,546,670 | A | 8/1996 | Chiang | |
| D509,158 | S | 9/2005 | Silberberg | |
| 7,409,772 | B1 * | 8/2008 | Morrissey | 33/451 |
| 2008/0155844 | A1 * | 7/2008 | Norvell | 33/451 |

FOREIGN PATENT DOCUMENTS

GB 1369583 A * 10/1974 ............... G01C 9/12

* cited by examiner

*Primary Examiner* — R. A. Smith

(57) ABSTRACT

A multi-purpose measurement apparatus having a combination spirit level and a protractor, for precise measurement of orientation and angle of a material, the apparatus having a frame for resting against the material, said frame having a strip of ruler markings at the bottom portion of the face of the frame and the bottom portion of the rear of the frame, said frame further having a slot at a substantially centermost position of the frame; a clear, global housing, forming front and rear windows on the frame and in the slot at the substantially centermost position of the frame, the housing filled with an oil composition.

12 Claims, 3 Drawing Sheets

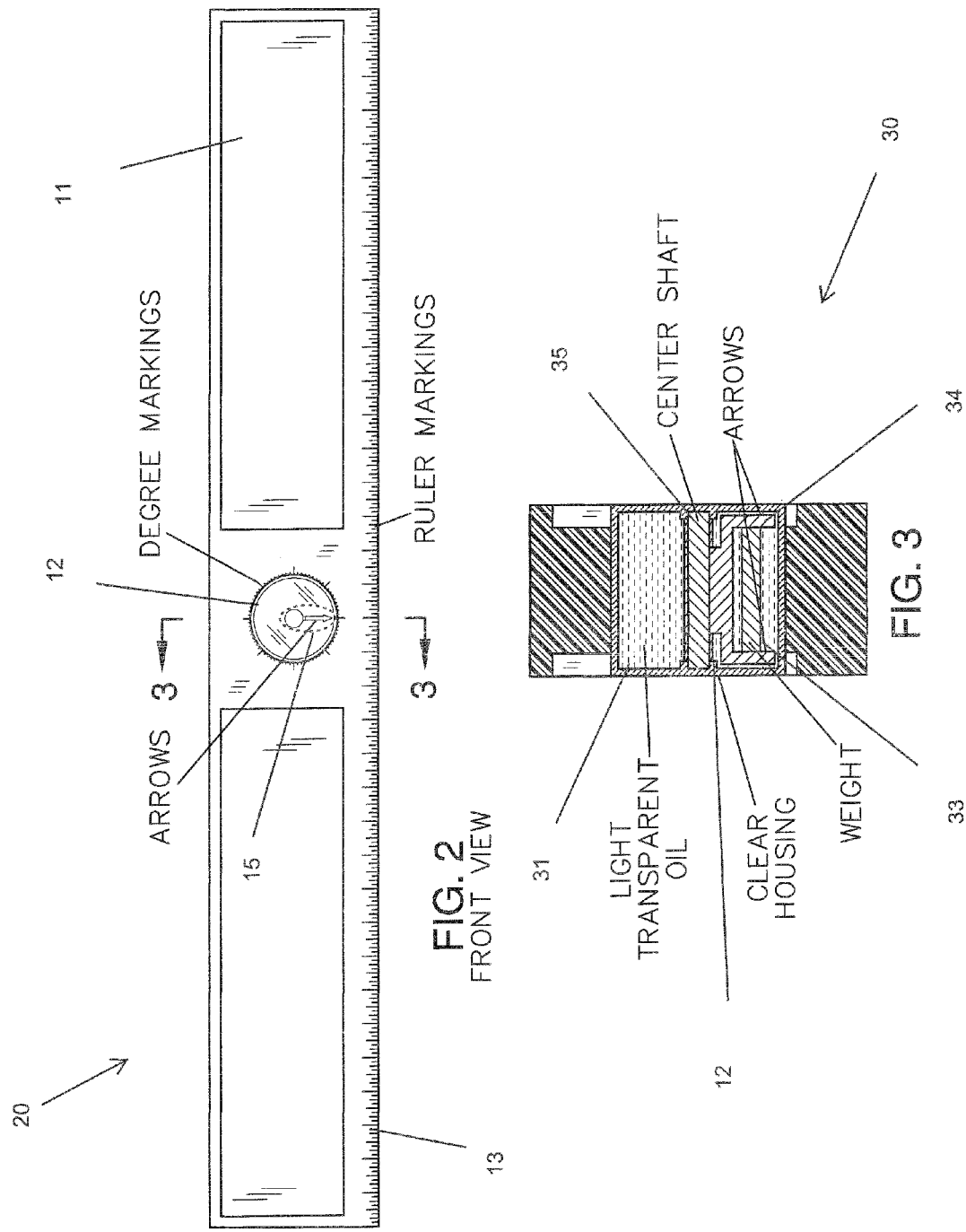

COMBINATION LEVEL AND PROTRACTOR

BACKGROUND OF THE INVENTION

The present invention relates generally to multipurpose levels that determine angular relationships while also providing a protractor and ruler means.

SUMMARY

It is believed that the measurements determined using the present invention are currently measured with technology other than the present invention using a variety of tools and instruments. With the standard level, for example, a user must use a different level for each angle. Using multiple instruments is cumbersome and time consuming. Thus, there is a need for a combination instrument that enables a user to determine multiple measurements with just one tool and to work accurately, with any angle.

In some embodiments, the present invention features a combination measurement unit combining the utility of an ordinary level and a protractor. In some embodiments, the apparatus comprises a frame with a set of ruler markings, where the frame further comprises a center housing, said center housing containing an angle indicator system which signals to a user the angle of a material of interest.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 2 is a front view of the present invention demonstrating the location of the ruler markings and angular graduation.

FIG. 3 is an internal, side view of the present invention demonstrating the housing and the various components the housing comprises.

DESCRIPTION OF PREFERRED EMBODIMENTS

Figure 1:
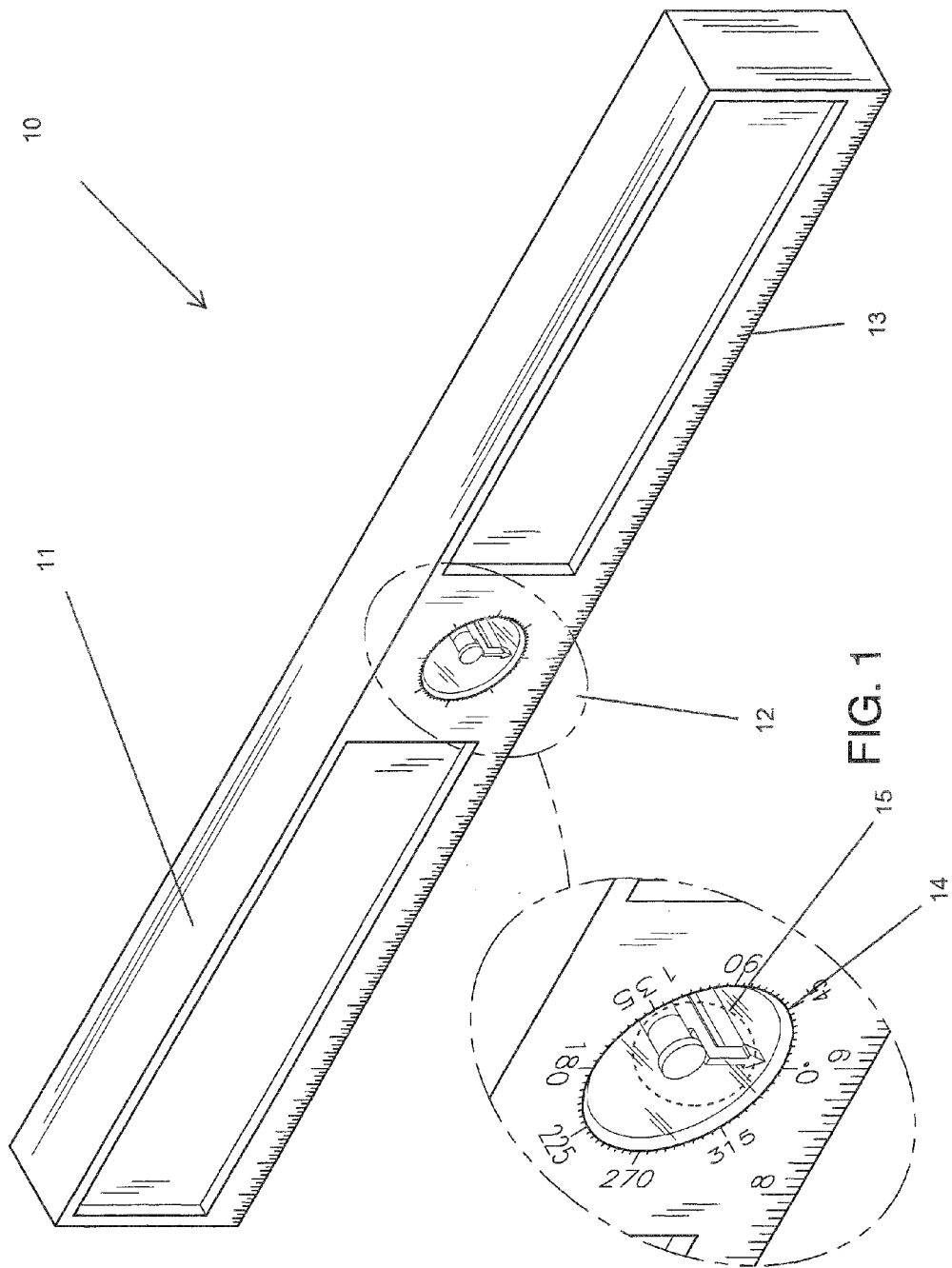
FIG. 1 is a front view of the of the present invention with a caption zoomed in on the housing of the frame.
Figure 4:
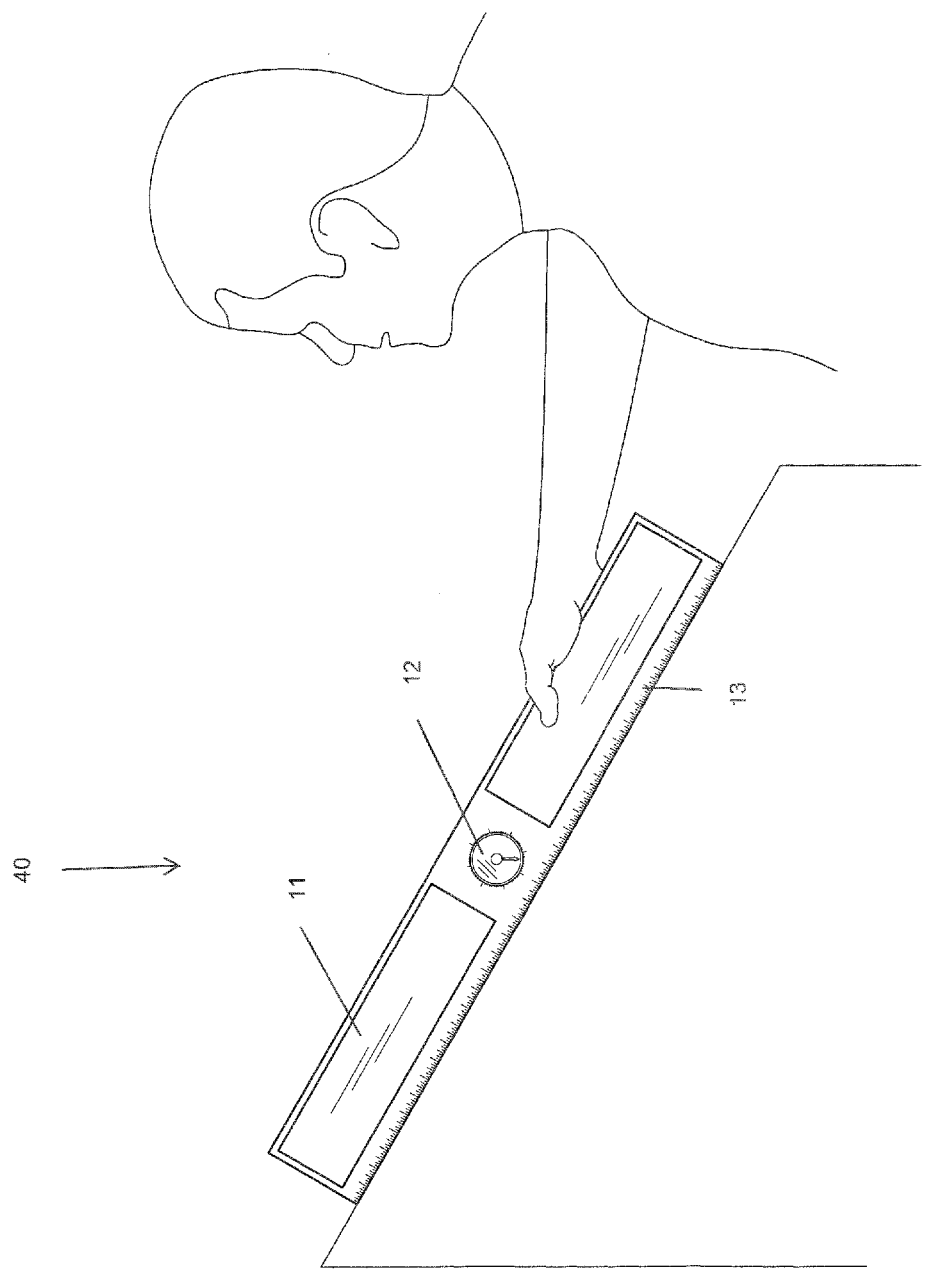
FIG. 4 is a user view of the present invention demonstrating the apparatus' ability to identify the angle of a material when the frame is placed against the surface of the material.

Referring now to FIG. 1-4, the present invention, in some embodiments features a multi-purpose measurement apparatus comprising, a combination spirit level and a protractor, for precise measurement of orientation and angle of a material. The individual components of the apparatus include the following.

First, a frame [11] for resting against some material. The bottom portion of the frame [11] can be a flat and straight surface, and said frame [11] can comprise a strip of ruler markings [13] disposed at the bottom portion of the face of the frame [11] and the bottom portion of the rear of the frame [11]. The frame [11] can further comprise a slot, located at a substantially centermost position of the frame [11].

Second, a clear, global housing [12], forming front and rear windows on the frame [11] where the housing is disposed, or fits in the slot at the substantially centermost position of the frame [11]. In some embodiments, the housing [12] can be filled with an oil composition [31]. The housing [12] can further comprise a set of angular graduation [14] labeled on the front and rear of the housing [12].

Third, an angle indicator system [15] located within the housing [12] which signals the angle of the frame [11] against the material. The angle indicator system [15] further comprising a bearing [35] where the bearing has a first end and a second end. The bearing [35] can be fixedly attached to opposing inner ends of the front and rear windows of the frame [11], the first and second ends of the bearing [35] can be aligned with the face and rear of the frame [11] and the bearing [35] can be disposed perpendicular to the top and bottom of the housing [12] and the frame. The angle indicator system also includes a bearing frame comprising a pair of rigid radial arrows [34], the arrows [34] facing the same direction and disposed in a parallel position where proximal ends of the arrows connect said arrows to the bearing [35] at opposite ends of the first and second ends of the bearing [35], wherein the bearing frame is rotatable about an axis of rotation created by the bearing [35]. The angle indicator system can also include a weight [33], suspended between the pair of arrows [34] at a distal end of the arrows [34] and of the bearing frame.

In some embodiments, the angle indicator system [15] rotates about the bearing [35], and the arrows [34] signal an angle corresponding to the physical position of the frame [11] against the material and wherein the frame [11] also functions as a ruler or protractor.

The present invention could comprise a variety of sizes and possibly different aesthetic designs as well, without inhibiting the important utilities the invention provides.

The present invention is convenient, easy to use, light weight, and can save time and costs. Residential and nonresidential construction contractors, in particular carpenters and electricians, could find that the present invention quite helpful and also, they would find that only one tool (the present invention) is needed on any job site.

As used herein, the term "about" refers to plus or minus 10% of the referenced number.

As used herein, the term "about" refers to plus or minus 10% of the referenced number. For example, an embodiment wherein the device is about 10 inches in length includes a device that is between 9 and 11 inches in length.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A multi-purpose measurement apparatus comprising a combination spirit level and a protractor, for precise measurement of orientation and angle of a material, the apparatus comprising:

a. a frame [11] for resting against the material, the bottom portion of the frame [11] being a flat and straight surface, said frame [11] comprising a strip of ruler markings [13] disposed at the bottom portion of the face of the frame [11] and the bottom portion of the rear of the frame [11], said frame [11] further comprising a slot at a substantially centermost position of the frame [11];

b. a clear, global housing [12], forming front and rear windows on the frame [11] and disposed in the slot at the substantially centermost position of the frame [11], the housing [12] filled with an oil composition [31], the housing [12] further comprising a set of angular graduation [14] labeled on the front and rear of the housing [12], the housing [12] further comprising:

i. an angle indicator system [15] disposed within the housing [12] which signals the angle of the frame [11] against the material, the angle indicator system [15] further comprising:

1. a bearing [35], the bearing having a first end and a second end, the bearing [35] fixedly attached to opposing inner ends of the front and rear windows of the frame [11], the first and second ends of the bearing [35] aligned with the face and rear of the frame [11], the bearing [35] disposed perpendicular to the top and bottom of the housing [12] and the frame;

2. a bearing frame comprising a pair of rigid radial arrows [34], the arrows [34] facing the same direction and disposed in a parallel position where proximal ends of the arrows connect said arrows to the bearing [35] at opposite ends of the first and second ends of the bearing [35], wherein the bearing frame is rotatable about an axis of rotation created by the bearing [35]; and 3. a flat weight [33], suspended between the pair of arrows [34] at a distal end of the arrows [34] and of the bearing frame, wherein the angle indicator system [15] rotates about the bearing [35], and the arrows [34] signal an angle corresponding to the physical position of the frame [11] against the material and wherein the frame [11] also functions as a ruler or protractor.

2. The frame of claim 1, wherein the frame comprises metal, plastic or wood.

3. The frame of claim 1, wherein the frame comprises 2 inches in length, and 2 inches in width.

4. The frame of claim 1, wherein the frame comprises a length ranging from 1 inches to 20 inches in length and wherein the frame comprises a width ranging from 1 inches to 20 inches in length.

5. The frame of claim 1, wherein the frame comprises a length ranging from 0.25 inches to 40 inches in length and wherein the frame comprises a width ranging from 0.25 inches to 40 inches in length.

6. The frame of claim 1, wherein the frame comprises a length ranging from 40 inches to 100 inches in length and wherein the frame comprises a width ranging from 40 inches to 100 inches in length.

7. The frame of claim 1, wherein the frame comprises a height ranging from 0.10 inches to 10 inches.

8. The frame of claim 1, wherein the frame comprises a height ranging from 10 inches to 100 inches.

9. The oil composition [31] of claim 1, wherein the oil composition [31] is a lightweight oil composition.

10. The housing [14] of claim 1, wherein the housing comprises 90-95% of the oil composition [31].

11. The housing [14] of claim 1, wherein the housing is made of plastic or glass.

12. A multi-purpose measurement apparatus consisting of a combination spirit level and a protractor, for precise measurement of orientation and angle of a material, the apparatus consists of:

a. a frame [11] for resting against the material, the bottom portion of the frame [11] being a flat and straight surface, said frame [11] consists of a strip of ruler markings [13] disposed at the bottom portion of the face of the frame [11] and the bottom portion of the rear of the frame [11], said frame [11] further consists of a slot at a substantially centermost position of the frame [11];

b. a clear, global housing [12], forming front and rear windows on the frame [11] and disposed in the slot at the substantially centermost position of the frame [11], the housing [12] filled with an oil composition [31], the housing [12] further consists of a set of angular graduation [14] labeled on the front and rear of the housing [12], the housing [12] further consists of:

i. an angle indicator system [15] disposed within the housing [12] which signals the angle of the frame [11] against the material, the angle indicator system [15] further consists of:

1. a bearing [35], the bearing consisting of a first end and a second end, the bearing [35] fixedly attached to opposing inner ends of the front and rear windows of the frame [11], the first and second ends of the bearing [35] aligned with the face and rear of the frame [11], the bearing [35] disposed perpendicular to the top and bottom of the housing [12] and the frame;

2. a bearing frame consisting of a pair of rigid radial arrows [34], the arrows [34] facing the same direction and disposed in a parallel position where proximal ends of the arrows connect said arrows to the bearing [35] at opposite ends of the first and second ends of the bearing [35], wherein the bearing frame is rotatable about an axis of rotation created by the bearing [35]; and 3. a flat weight [33], suspended between the pair of arrows [34] at a distal end of the arrows [34] and of the bearing frame, wherein the angle indicator system [15] rotates about the bearing [35], and the arrows [34] signal an angle corresponding to the physical position of the frame [11] against the material and wherein the frame [11] also functions as a ruler or protractor.

* * * * *